(12) United States Patent
Henderson et al.

(10) Patent No.: US 7,386,579 B2
(45) Date of Patent: Jun. 10, 2008

(54) SYSTEM, METHOD, AND COMPUTER PROGRAM PRODUCT FOR STORING TEST RESULTS IN A DATABASE

(75) Inventors: Barnaby Henderson, Milton (GB); Keir Finlow-Bates, Comberton (GB)

(73) Assignee: Siemens Product Life Cycle Management Software Inc.

( * ) Notice: Subject to any disclaimer, the term of this patent is extended or adjusted under 35 U.S.C. 154(b) by 537 days.

(21) Appl. No.: 10/706,843

(22) Filed: Nov. 12, 2003

(65) Prior Publication Data
US 2005/0102323 A1 May 12, 2005

(51) Int. Cl.
*G06F 12/00* (2006.01)
*G06F 17/30* (2006.01)

(52) U.S. Cl. .................. 707/203; 707/100; 707/102; 707/200; 717/124

(58) Field of Classification Search ............... 707/1, 707/100, 101, 102, 203; 717/124
See application file for complete search history.

(56) References Cited

U.S. PATENT DOCUMENTS

| | | | | |
|---|---|---|---|---|
| 4,868,570 A | | 9/1989 | Davis | 341/106 |
| 5,909,544 A | * | 6/1999 | Anderson et al. | 709/208 |
| 5,987,633 A | | 11/1999 | Newman et al. | 714/712 |
| 6,006,232 A | | 12/1999 | Lyons | 707/101 |
| 6,167,537 A | * | 12/2000 | Silva et al. | 714/46 |
| 6,182,245 B1 | * | 1/2001 | Akin et al. | 714/38 |
| 6,662,312 B1 | * | 12/2003 | Keller et al. | 714/38 |
| 6,779,134 B1 | * | 8/2004 | Laviolette et al. | 714/38 |
| 2003/0041059 A1 | * | 2/2003 | Lepien | 707/5 |
| 2003/0098879 A1 | * | 5/2003 | Mathews | 345/762 |
| 2003/0208542 A1 | * | 11/2003 | Deming et al. | 709/205 |
| 2003/0212938 A1 | * | 11/2003 | Sutton | 714/724 |
| 2004/0030676 A1 | * | 2/2004 | Wagner | 707/2 |
| 2005/0071818 A1 | * | 3/2005 | Reissman et al. | 717/127 |

OTHER PUBLICATIONS

A. Monge et al. "An Efficient Domain—Independant Algorithm For Detecting Approximately Duplicate Database Records", Proceedings of the Sigmod 1997 Workshop on Research Issues on Data Mining and Knowledge Discovery, May 1997, 7 pages.

\* cited by examiner

*Primary Examiner*—Luke S. Wassum
*Assistant Examiner*—Susan F Rayyan

(57) ABSTRACT

A system, method, and computer program product for creating and managing a database. Product test results are efficiently stored in a database in such a way that the database updates test result entries on the basis of result changes as successive build tests are performed.

12 Claims, 4 Drawing Sheets

| Test Name | Start Build | End Build | Status |
|---|---|---|---|
| PR47001 | 001 | 099 | Run Time Error |
| PR47001 | 100 | | Fail |
| PR47002 | 001 | | Pass |
| PR47003 | 001 | 098 | Time Out |
| PR47003 | 099 | | Pass |
| PR47004 | 001 | 099 | Fail |
| PR47004 | 100 | | Pass |

Figure 3

|              | Build |     |     |     |       |     |     |     |
|--------------|-------|-----|-----|-----|-------|-----|-----|-----|
| Test Name    |       | 001 | 002 | 003 | ...   | 098 | 099 | 100 |
| PR47001      |       | Run Time Error ||||| Fail ||
| PR47002      |       | Pass |||||||
| PR47003      |       | Time Out ||||| Pass |||
| PR47004      |       | Fail ||||||| Pass |

Figure 4

SYSTEM, METHOD, AND COMPUTER PROGRAM PRODUCT FOR STORING TEST RESULTS IN A DATABASE

TECHNICAL FIELD OF THE INVENTION

The present invention is generally related to database creation and management.

BACKGROUND OF THE INVENTION

Product testing requires a large number of tests to be run, and each test result must be stored. For example, one software product in development can require that up to 500,000 tests be run each night. It is of great importance that the developers track and manage regressions in the product.

If each test result were to be stored in a separate record in a database, then we would expect in excess of 150 billion test records (or rows) to be generated in the test database each year. A database with this many records has a number of logistical problems, including search times that are prohibitively high. Further, back-up times and disk space usage are sub-optimal, the database user experiences slow response, as portions of the database are paged in and out of memory, and fixing errors and handling missing records is difficult. Additional problems arise if the database is to be used over a WAN instead of a LAN.

As a result, test departments often "throw away" test results for previous product releases, and sometimes even for tests run only a few weeks ago. This can cause real problems when several different versions of a product are maintained. Similarly, throwing away the history of previous tests is not conducive to the quality process.

There is, therefore, a need in the art for a system, process and computer program product for creating a manageable database containing all the results of the automated test runs, and for other purposes.

SUMMARY OF THE INVENTION

A preferred embodiment provides a system, method, and computer program product for creating and managing a database. In this embodiment, product test results are efficiently stored in a database in such a way that the database updates test result entries on the basis of result changes as successive build tests are performed.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 3 depicts an exemplary database table created in accordance with an embodiment of the present invention; and FIG. 4 depicts a pictorial representation of an exemplary database table created in accordance with an embodiment of the present invention.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

A preferred embodiment provides a system, method, and computer program product for creating and managing a database. In this embodiment, product test results are efficiently stored in a database in such a way that the database updates test result entries on the basis of result changes as successive build tests are performed.

Figure 1:
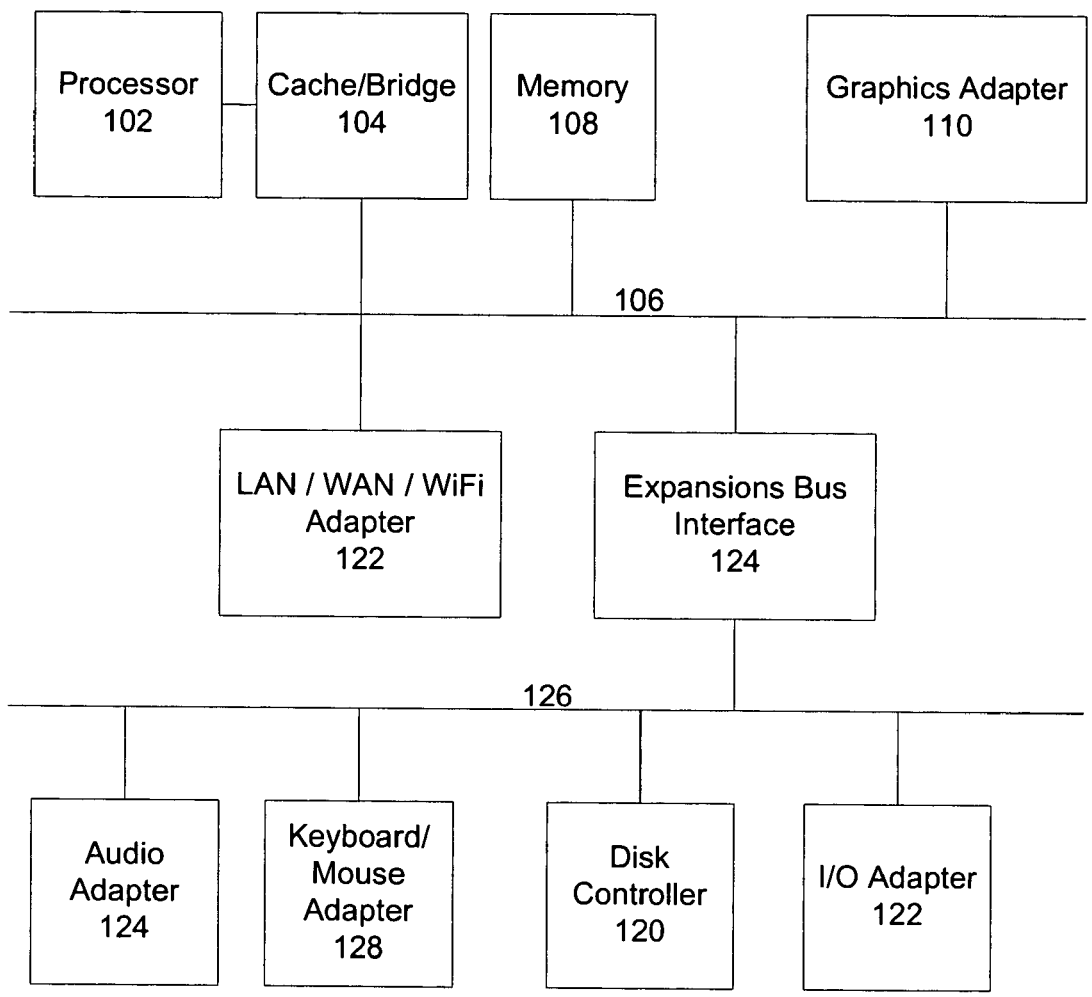
FIG. 1 depicts a block diagram of a data processing system in which a preferred embodiment can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

An exemplary implementation of the method defines the following four fields to exist in the record format:

Test Name: A string. Each test must have a unique test name

Start Build: An integer.

End Build: An integer.

Status: A string. Typically one of: "pass", "fail", "run time error", or "time out", although other statuses may be relevant to different projects.

Those of skill in the art will recognize that these fields can carry any appropriate label, as long as they are filled and manipulated as described herein. Further, where an action is described herein as dependent on a specific entry in a field, or on an empty field, the skilled artisan will recognize that different implementations can use different values for any of these within the scope of the invention.

Other fields may be added to the record format to allow extra information about individual test results to be stored, for example a comments field to allow test engineers to add comments for clarification, an action to take field, and a test family name field to allow sensible grouping of batteries of tests.

In the method described below, the master table that holds the results for all the test runs is referred to as the "main table".

The method processes the test results that, in this example, are produced in the form of ASCII log files generated by the test harnesses as they run the tests.

Figure 2:
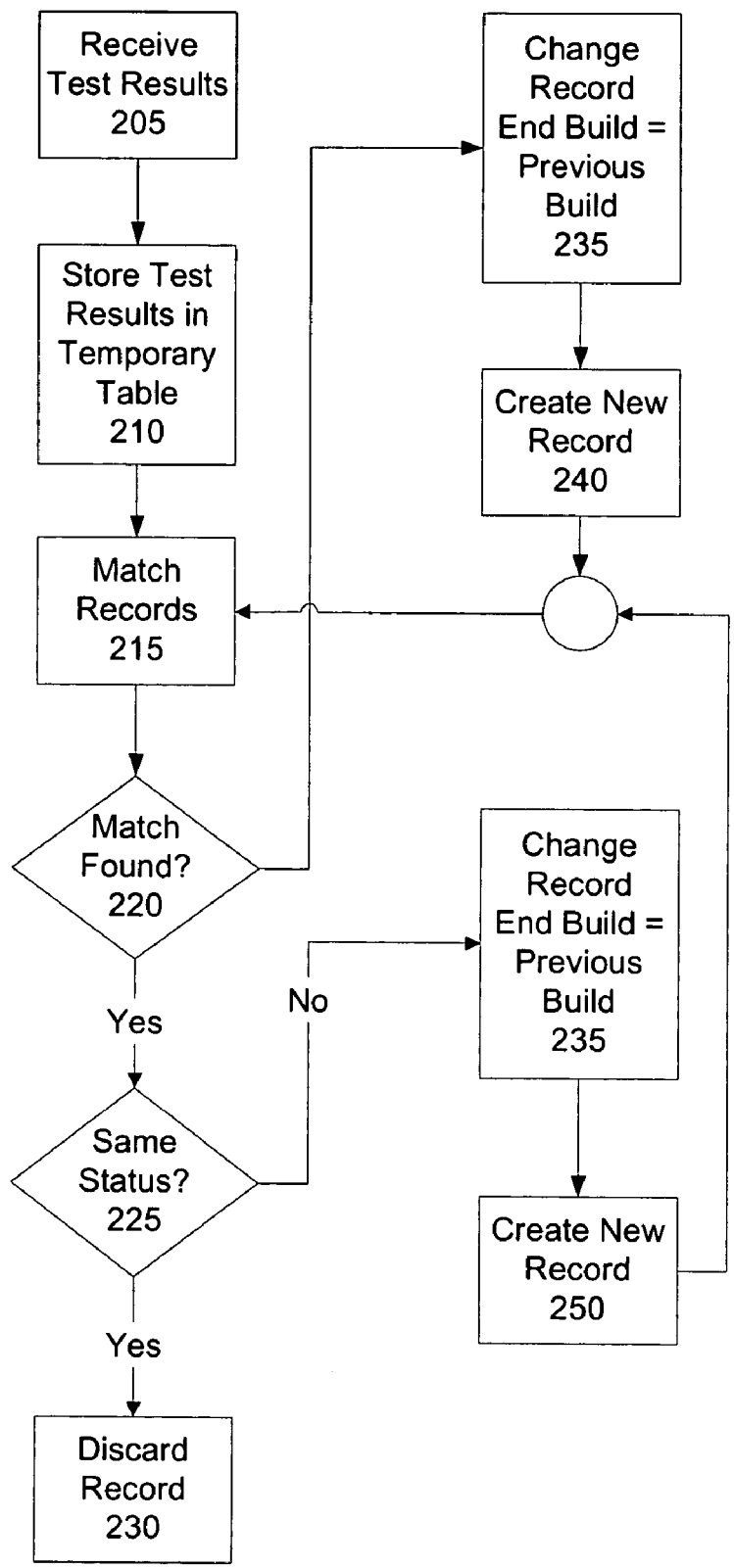
FIG. 2 depicts a flowchart of a process in accordance with a preferred embodiment.

FIG. 2 depicts a flowchart of a process in accordance with a preferred embodiment.

First, the system will receive the test results from the current build (step 205), and the test results are placed in a temporary table (step 210). The temporary table is typically stored in the results database, and one record created for each test result.

Each result record in the main table that has an empty "end build" field (of which there should always be one, and only one, per unique test) is matched with the record in the temporary results table that has the same test name (or combination of test name and family name if this is not otherwise unique) (step 215).

If a record match is found (step 220), then if both records have the same status (step 225), the record from the temporary table is ignored (step 230).

If the records have different statuses, the record from the main table has its "end build" field set equal to the previous build number for which the test was run (step 245), and a new record is created in the main table that is a copy of the record in the temporary table (step 250). The new record has an empty "end build", and a "start build" set equal to the current build. It also has the same "test name" and "status" as the record in the temporary table.

If no record match is found in the temporary table then that means that the test was not run. If the "status" of the record in the main table is already "Not Run" then the record from the temporary table is ignored. Otherwise the record from the main table has its "end build" field set equal to the previous build number for which the test was run (step 235), and a new record is created in the main table that has an empty "end build", a "start build" set equal to the current build, and a "status" of "Not Run" (step 240). It also has the same "test name" as the record from the temporary table.

The process repeats for the next record in the main table that has an empty "end build" (returning to step 215).

When the process has been completed for all the records in the main table there needs to be a search for new tests that have not been run before. A search is made of the temporary table for records that have a "test name" without a match in the main table. If such records are found then they are added to the main table.

FIG. 3 depicts a sample database table for four tests that have been run against 100 builds of a software product. In this example, the current build is 100, with the results stored using the method described in this disclosure.

As can be seen in FIG. 3, test "PR47001" caused a "Run Time Error" from build 001 to build 099, and a "Fail" on build 100. There is no "end build" entry after build 100 for this test, since the end build entry is only changed when the status/test result changes.

Test PR47002 has a status of "Pass" for all builds after (and including) build 001.

Test PR47003 caused a "Time Out" from build 001 to build 098, and a "Pass" for all builds after (and including) build 099.

Test PR47004 caused a "Fail" from build 001 to build 099, and a "Pass" for all builds after (and including) build 100.

As can be seen, this test result database is much smaller than a typical test database, in that a new entry is only required when the result for a particular test changes.

FIG. 4 depicts a pictorial representation of the table shown in FIG. 3, which illustrates why the number of records in the database is reduced. It can be seen that a new record is only required when the result for a particular test changes.

Each block in the main body of FIGS. 3 and 4 represents one database record. Under a traditional "one record per result" schema, there would be 400 records in the database if the four sample tests shown above were run against 100 builds of the software. With the system described in this disclosure, there are only 7.

In alternate embodiments, the system and method could rely on two or more parameters that could be split into a "start build"/"end build" pair, for example "start time"/"end time", "start position"/"end position", and the record number could be reduced in such cases.

Also, alternately, more than one state change (as recorded in the "status" field") might be measured against; a change in any of these "status"-like fields would trigger the closing of the old record and the creating of a new record as in step 4 part II above.

Further, it is not strictly necessary to record a "start build" for any of the records, as this information can be constructed by calling up all the records with the same test name and ordering them according to their "end build", with the last record being the one with an empty "end build". This method would give the same reduction in the number of records, but would make searching the "history" of a specific test more difficult as extra calculations for the ordering algorithm are required. More importantly it would not record when the test was first run.

The method described above provides many advantages in a regression detection and management system, including:

1. Dramatically reducing the size of the test data stored without losing any information. This reduction in data size results in faster database search and synchronization functionality, and reduces the disk space used in storing the results.

2. Providing the test result data in a concise format for our user interface to present to the test engineers and information specialists who work with the results.

These two advantages, among others, result in users of the disclosed system being able to quickly and efficiently track down and present the regressions and/or changes in the test results.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for storing test results in a database, comprising:
   receiving test results, the test results including a plurality of test result records, each test result record associated with a test identifier, a build version identifier, and a test result identifier;
   storing the test results in a temporary storage location;
   comparing each test result record with the contents of a test result database, the test result database having a plurality of compiled test result records, each compiled test result record associated with a test identifier, a start build version identifier, an end build version identifier, and a test result identifier;
   if a test result record and a compiled test result record have matching test identifiers and matching test result identifiers, then discarding the test result record; and
   if a test result record and a compiled test result record have matching test identifiers and different test result identifiers, then modifying the end build identifier of the compiled test result record and creating a new compiled test result record in the test result database, the new compiled test result record having the same test identifier and test result identifier as the test result record, and having a start build version identifier corresponding to the build version identifier of the test result record.

2. The method of claim 1, wherein when a test result record and a compiled test result record have matching test identifiers and different test result identifiers, then the end build identifier of the compiled test result record is modified to have a value of one less than the build version identifier of the test result record.

3. The method of claim 1, further comprising, if a compiled test result record has no matching test identifier as a test result record in the temporary storage location, then modifying the end build identifier of the compiled test result record to have a value of one less than the build version identifier of the test result record, and creating a new compiled test result record in the test result database, the new compiled test result record having the same test identifier as the test result record, and having a start build version identifier corresponding to the build version identifier of the test result record, and having a test result identifier indicating that a test was not run.

4. The method of claim 1, further comprising, if a test result record in the temporary storage location has no matching test identifier as a compiled test result record, then creating a new compiled test result record in the test result database, the new compiled test result record having the same test identifier as the test result record, and having a start build version identifier corresponding to the build version identifier of the test result record, and having the same test result identifier as the test result record.

5. A data processing system having at least a processor and accessible memory, comprising:

means for receiving test results, the test results including a plurality of test result records, each test result record associated with a test identifier, a build version identifier, and a test result identifier;

means for storing the test results in a temporary storage location;

means for comparing each test result record with the contents of a test result database, the test result database having a plurality of compiled test result records, each compiled test result record associated with a test identifier, a start build version identifier, an end build version identifier, and a test result identifier;

means for, if a test result record and a compiled test result record have matching test identifiers and matching test result identifiers, discarding the test result record; and means for, if a test result record and a compiled test result record have matching test identifiers and different test result identifiers, modifying the end build identifier of the compiled test result record and creating a new compiled test result record in the test result database, the new compiled test result record having the same test identifier and test result identifier as the test result record, and having a start build version identifier corresponding to the build version identifier of the test result record.

6. The data processing system of claim 5, wherein when a test result record and a compiled test result record have matching test identifiers and different test result identifiers, then the end build identifier of the compiled test result record is modified to have a value of one less than the build version identifier of the test result record.

7. The data processing system of claim 5, further comprising means for, if a compiled test result record has no matching test identifier as a test result record in the temporary storage location, modifying the end build identifier of the compiled test result record to have a value of one less than the build version identifier of the test result record, and means for creating a new compiled test result record in the test result database, the new compiled test result record having the same test identifier as the test result record, and having a start build version identifier corresponding to the build version identifier of the test result record, and having a test result identifier indicating that a test was not run.

8. The data processing system of claim 5, further comprising means for, if a test result record in the temporary storage location has no matching test identifier as a compiled test result record, creating a new compiled test result record in the test result database, the new compiled test result record having the same test identifier as the test result record, and having a start build version identifier corresponding to the build version identifier of the test result record, and having the same test result identifier as the test result record.

9. A computer program product tangibly embodied in a machine-readable storage medium, comprising:

instructions for receiving test results, the test results including a plurality of test result records, each test result record associated with a test identifier, a build version identifier, and a test result identifier;

instructions for storing the test results in a temporary storage location;

instructions for comparing each test result record with the contents of a test result database, the test result database having a plurality of compiled test result records, each compiled test result record associated with a test identifier, a start build version identifier, an end build version identifier, and a test result identifier;

instructions for, if a test result record and a compiled test result record have matching test identifiers and matching test result identifiers, discarding the test result record; and instructions for, if a test result record and a compiled test result record have matching test identifiers and different test result identifiers, modifying the end build identifier of the compiled test result record and instructions for creating a new compiled test result record in the test result database, the new compiled test result record having the same test identifier and test result identifier as the test result record, and having a start build version identifier corresponding to the build version identifier of the test result record.

10. The computer program product of claim 9, wherein when a test result record and a compiled test result record have matching test identifiers and different test result identifiers, then the end build identifier of the compiled test result record is modified to have a value of one less than the build version identifier of the test result record.

11. The computer program product of claim 9, further comprising instructions for, if a compiled test result record has no matching test identifier as a test result record in the temporary storage location, modifying the end build identifier of the compiled test result record to have a value of one less than the build version identifier of the test result record, and instructions for creating a new compiled test result record in the test result database, the new compiled test result record having the same test identifier as the test result record, and having a start build version identifier corresponding to the build version identifier of the test result record, and having a test result identifier indicating that a test was not run.

12. The computer program product of claim 9, further comprising instructions for, if a test result record in the temporary storage location has no matching test identifier as a compiled test result record, creating a new compiled test result record in the test result database, the new compiled test result record having the same test identifier as the test result record, and having a start build version identifier corresponding to the build version identifier of the test result record, and having the same test result identifier as the test result record.

* * * * *

UNITED STATES PATENT AND TRADEMARK OFFICE
CERTIFICATE OF CORRECTION

PATENT NO. : 7,386,579 B2
APPLICATION NO. : 10/706843
DATED : June 10, 2008
INVENTOR(S) : Barnaby Henderson et al.

Page 1 of 1

It is certified that error appears in the above-identified patent and that said Letters Patent is hereby corrected as shown below:

Column 6, line 19, claim 1, delete "tbe" and replace with --the--.

Signed and Sealed this

Twenty-third Day of February, 2010

David J. Kappos
*Director of the United States Patent and Trademark Office*